United States Patent [19]

Kawabata

[11] Patent Number: 5,416,701
[45] Date of Patent: May 16, 1995

[54] HYDRAULIC SUPPLY ARRANGEMENT FOR USE WITH ACTIVE AUTOMOTIVE SUSPENSION OR THE LIKE

[75] Inventor: Kazunobu Kawabata, Yokohama, Japan

[73] Assignee: Nissan Motor Co., Ltd., Yokohama, Japan

[21] Appl. No.: 758,864

[22] Filed: Sep. 11, 1991

[30] Foreign Application Priority Data

Sep. 12, 1990 [JP] Japan .................................. 2-241453

[51] Int. Cl.⁶ ...................... B60G 13/06; F04B 49/00
[52] U.S. Cl. ........................... 364/424.05; 280/707; 280/709; 417/286
[58] Field of Search ............. 364/424.05, 424.01, 364/565; 280/707, 702, 709; 417/282, 286, 287, 289

[56] References Cited

U.S. PATENT DOCUMENTS

| | | | |
|---|---|---|---|
| 4,368,426 | 1/1983 | Hayashi et al. | 324/161 |
| 4,934,732 | 6/1990 | Fukunaga et al. | 280/707 |
| 5,085,459 | 2/1992 | Sato et al. | 280/707 |
| 5,160,160 | 11/1992 | Kawabata | 280/707 |
| 5,162,995 | 11/1992 | Ikemoto et al. | 364/424.05 |
| 5,174,598 | 12/1992 | Sato et al. | 280/707 |
| 5,176,399 | 1/1993 | Takehara et al. | 280/707 |
| 5,199,854 | 4/1993 | Aoyama | 417/282 |

FOREIGN PATENT DOCUMENTS 63-251313 10/1988 Japan .

*Primary Examiner*—Kevin J. Teska
*Assistant Examiner*—Collin W. Park
*Attorney, Agent, or Firm*—Lowe, Price, LeBlanc & Becker

[57] ABSTRACT

To avoid placing an unnecessary load on a prime mover, a pump control arrangement monitors automotive vehicle speed and inhibits an increase in pump output above a basic estimate when the vehicle speed is below a predetermined level. If the speed falls below the level while the pump output is above the basic estimate, the present operating mode is maintained for a given period before being reduced to the basic estimate level.

9 Claims, 18 Drawing Sheets

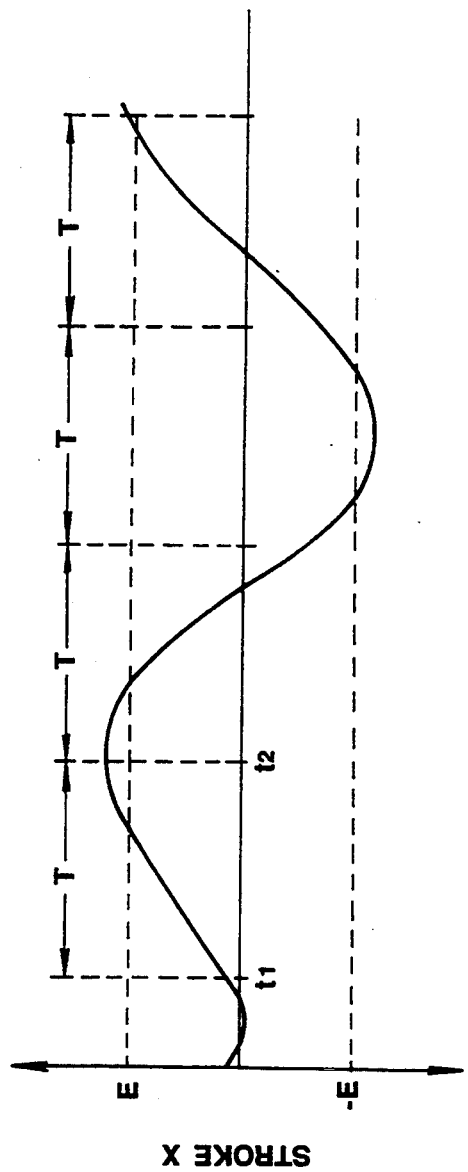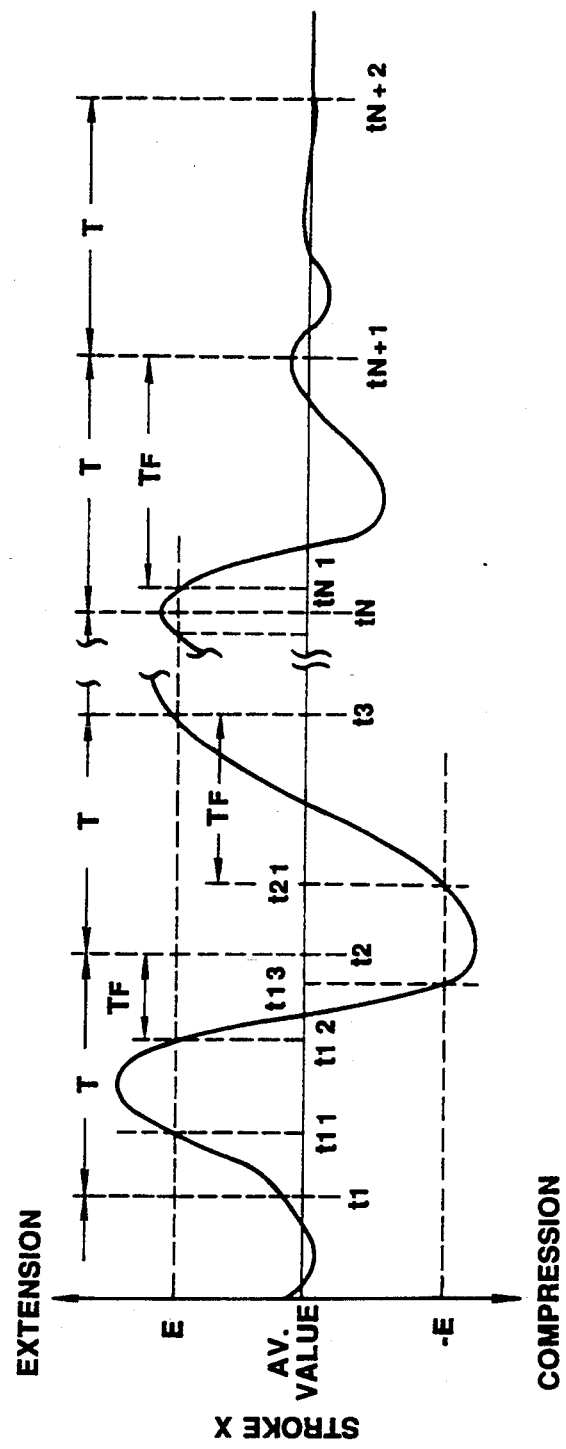
FIG.9(a)
FIG.9(b)

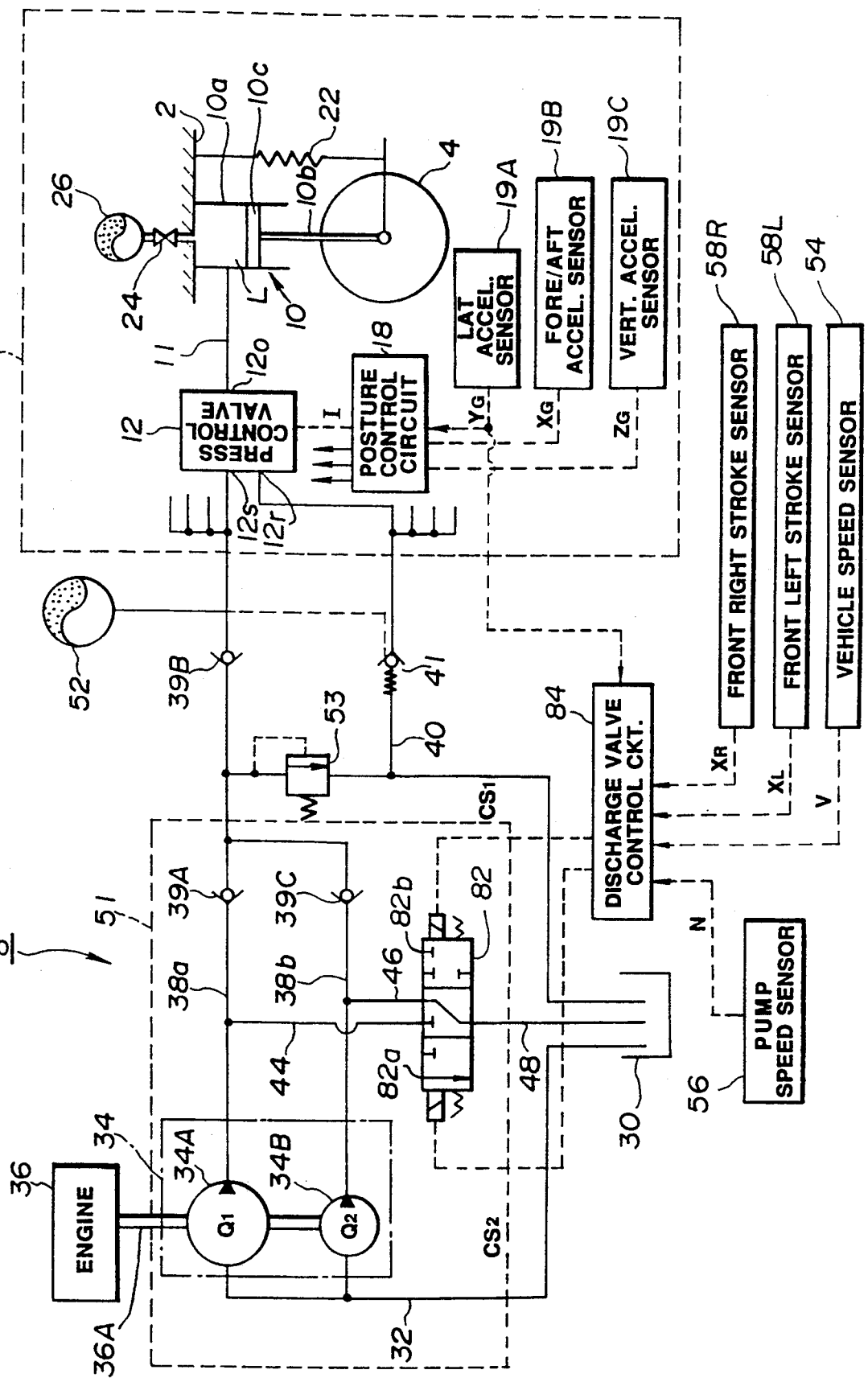

HYDRAULIC SUPPLY ARRANGEMENT FOR USE WITH ACTIVE AUTOMOTIVE SUSPENSION OR THE LIKE

BACKGROUND OF THE INVENTION

1. Field of the Invention

The present invention relates generally to a source of hydraulic fluid under pressure and more specifically to a source of hydraulic fluid under pressure which is particularly suited for use with an active suspension for the control of vehicular roll and pitch.

2. Description of the Prior Art

JP-A-63-251313 discloses an arrangement wherein a variable displacement type pump arrangement is operatively connected with a source of rotational energy, such as a prime mover (e.g. internal combustion engine) of an automotive vehicle, and the output of the pump is supplied to an active automotive vehicle suspension. In this arrangement vertical, lateral and fore/aft accelerations are used to determine the change in vehicle posture. When the change in posture exceeds a predetermined level, the amount of discharge from the pump to the active suspension is increased above a level used when the vehicle is stationary, and the increased discharge is supplied (by way of example) to a hydraulic fluid cylinder operatively connected between the sprung and unsprung components of the vehicle suspension.

However, this arrangement has suffered from a problem in that even though it aims to take advantage of the fact that the amount of power which is consumed when the vehicle is stationary, is less than that when the vehicle is running, the amount of pump discharge is always increased in response to large changes in vehicle posture. As the pump output is controlled on the high side during both high and low speed operations the pump load is undesirably increased under a number of operational modes when it is actually not needed and exerts a detrimental effect on the vehicle fuel economy.

For example, substantial fuel is consumed by the pump when the vehicle is running at very low speeds along an undulating road and the relative displacement between the chassis and the road wheels assumes a relatively large value. However, as the time frame in which the displacement occurs exhibits a very low ratio, corrective boosting of the pump displacement is not necessary and only results in fuel being wasted.

SUMMARY OF THE INVENTION

It is an object of the present invention to provide an automotive suspension pump control system having reduced pump load requirements by inhibiting the mode upgrading while the vehicle speed is below a predetermined level.

In brief, the above object is achieved by an arrangement wherein a pump control unit monitors vehicle speed and inhibits an increase in pump output above a basic estimate when the vehicle speed is below a predetermined level. If the speed falls below the speed limit while the pump output has been increased above the basic estimate, the instant mode is maintained for a given period before being reduced to the basic estimate level.

More specifically, a first aspect of the present invention relates to a vehicular hydraulic fluid supply arrangement which features: a first sensor for sensing a first predetermined parameter which varies with the operation of a hydraulically operated servo device; variable displacement pump means fluidly coupled with hydraulically operated servo device for supplying hydraulic fluid under pressure thereto; a vehicle speed sensor; means responsive to the first sensor for correcting an estimate of the amount of hydraulic fluid which is required to be supplied to the hydraulically operated servo; and means responsive to the vehicle speed sensor for selectively inhibiting the correction of the estimate.

A second aspect of the present invention relates to a vehicular hydraulic fluid supply arrangement which features: variable displacement pumps means; a first sensor for sensing one of lateral acceleration and vertical displacement of a vehicle; a vehicle speed sensor; means responsive to the first sensor for estimating the amount of hydraulic fluid which is required to be supplied to a predetermined servo arrangement; means responsive to the first sensor for correcting the hydraulic fluid amount estimate; and inhibiting means responsive to the vehicle speed sensor for inhibiting the correction of the hydraulic fluid amount estimate when the vehicle speed is below a predetermined level.

A third aspect of the present invention relates to a vehicle which features: a hydraulically operated servo device; a first sensor for sensing a first predetermined parameter which varies with the operation of the hydraulically operated servo device and which is indicative of the amount of hydraulic fluid consumed thereby; variable displacement pump means fluidly coupled with a hydraulically operated servo device for supplying hydraulic fluid under pressure thereto; a second sensor for sensing a second predetermined parameter which varies with the output of the variable displacement pump; a third sensor for sensing a third parameter which varies with the load on the hydraulically operated servo device; means for integrating an output of the first sensor and for using the result of the integration to estimate the amount of hydraulic fluid required by the hydraulically operated servo; means responsive to the first sensor for correcting an estimate of the amount of hydraulic fluid which is required to be supplied to the hydraulically operated servo; and means responsive to the third sensor for selectively inhibiting the correction of the estimate.

BRIEF DESCRIPTION OF THE DRAWINGS

FIGS. 9(a) and (b) are waveforms of suspension stroke with respect to time used to show how control timings are set;

FIG. 10 is a schematic diagram of a hydraulic fluid supply arrangement combined with an active automotive suspension in accordance with a second embodiment of the present invention;

DETAILED DESCRIPTION OF THE PREFERRED EMBODIMENTS

The embodiments of the present invention are disclosed in combination with an active vehicle suspension which utilizes the outputs of forward, lateral and vertical accelerometers to control the pressure applied to hydraulic cylinders of a vehicle suspension in a manner which attenuates/prevents pitching, rolling and the like.

Figure 1:
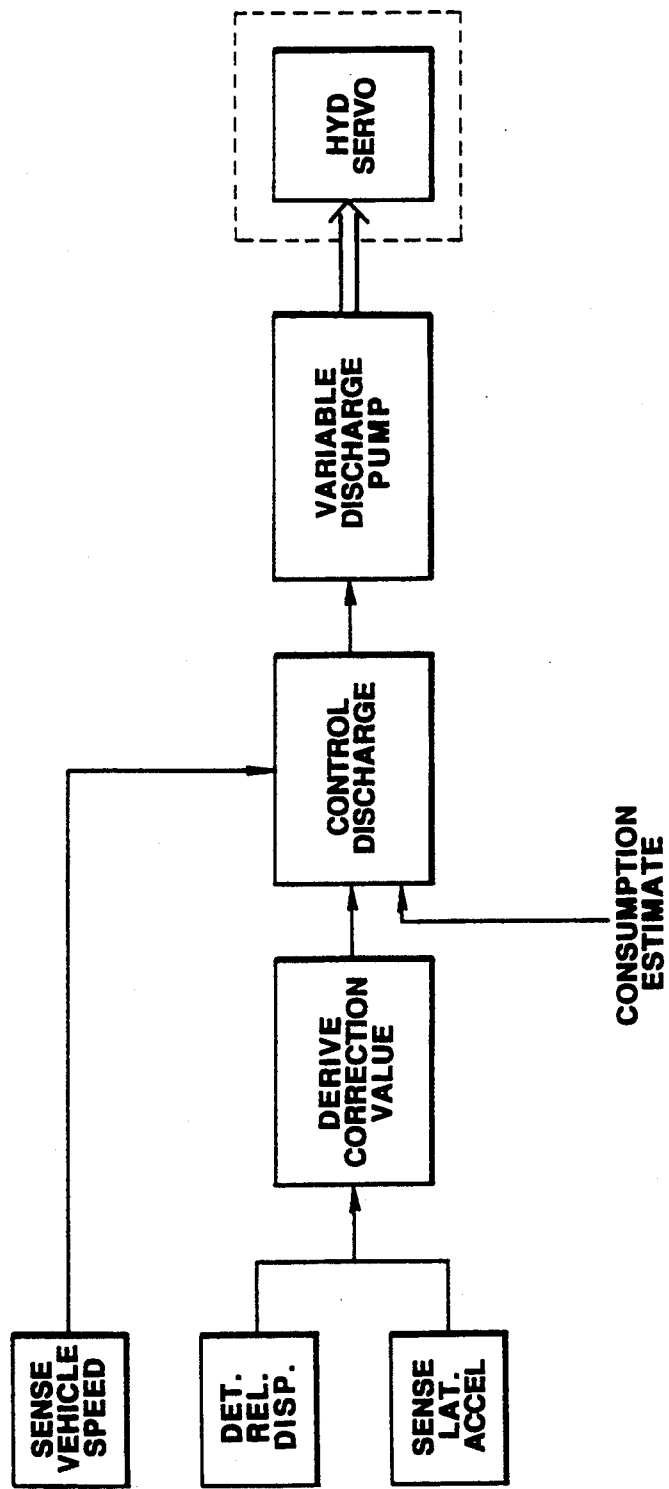
FIG. 1 is a block diagram of a system of the same general type as the present invention.
Figure 2:
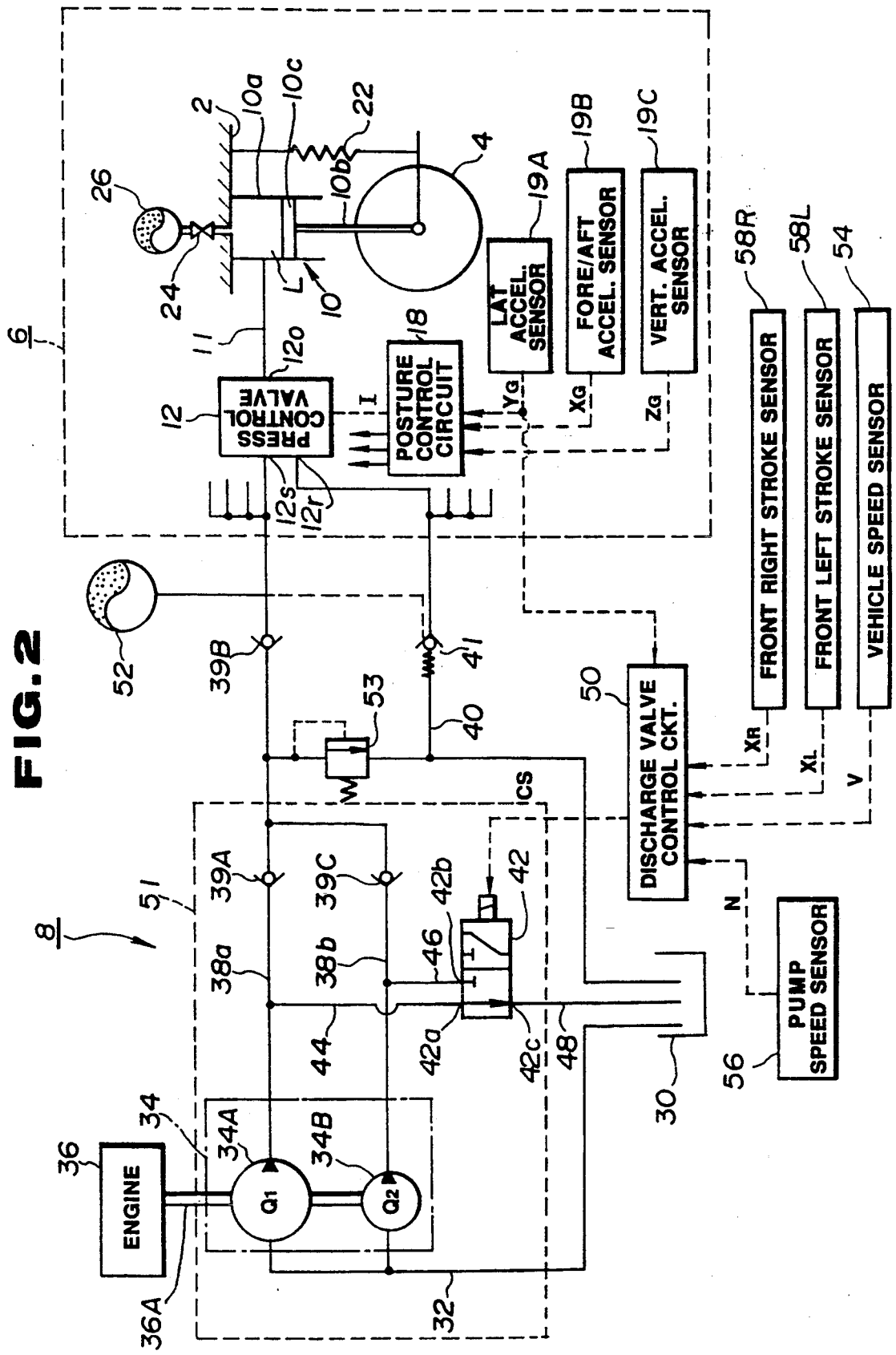
FIG. 2 is a schematic diagram of a hydraulic fluid supply arrangement combined with an active automotive suspension in accordance with a first embodiment of the present invention.

As shown in FIG. 2, a vehicle chassis 2 is operatively connected with road wheel(s) 4 by active suspension arrangement(s) powered by a source 8 of hydraulic fluid under pressure. For the sake of illustrative simplicity, only one of plural suspension arrangements is shown.

Each of the active suspensions 6 includes a hydraulic cylinder 10 and a pressure control valve 12; the plural active suspensions share a posture control circuit 18 and an accelerometer arrangement 19. Each hydraulic cylinder 10 includes a cylinder tube 10a which is connected to the vehicle chassis and a piston rod 10b connected with the road wheel 4. A piston 10c is connected to one end of the piston rod 10b and reciprocatively received in the cylinder tube 10a in a manner to define a variable volume pressure chamber L. This chamber L is connected to a pressure control valve 12 by way of a conduit 11. This valve has ports 12s, 12o and 12r. The first port 12s is connected with a pump, port 12o is connected with the chamber L via conduit 11 and port 12r is connected to a drain.

Figure 3:
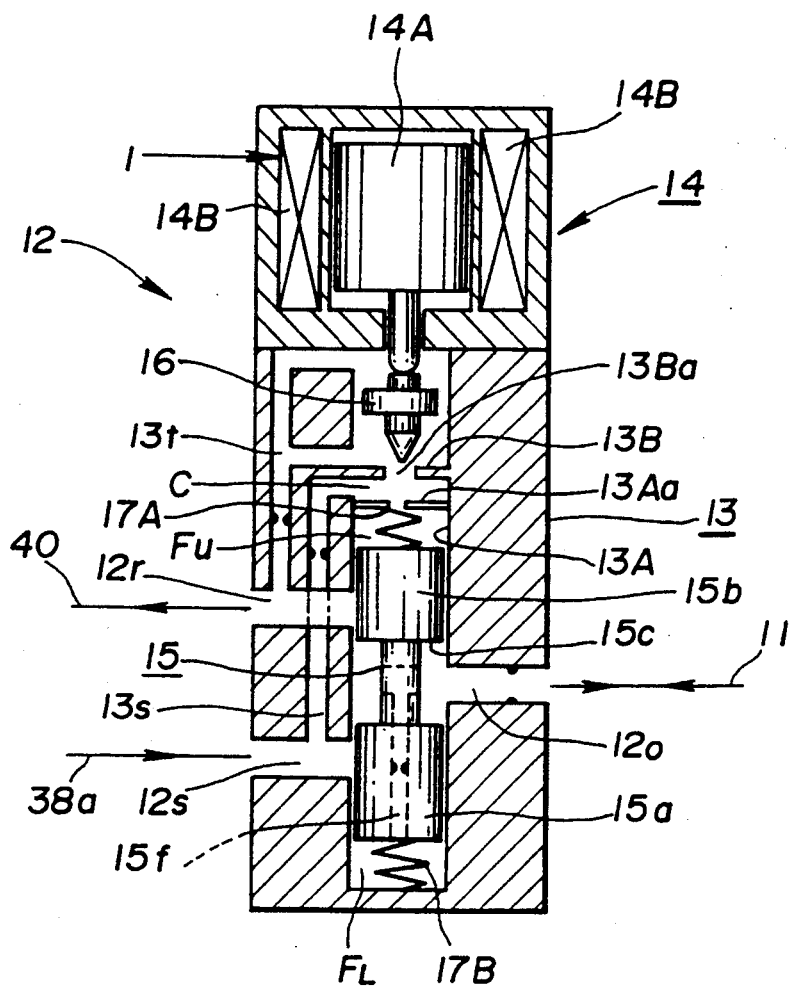
FIG. 3 is a sectional view of a pressure control valve used in the active suspension.

An example of the pressure control valve 12 is shown in FIG. 3. As will be appreciated, this valve includes a cylindrically shaped housing 13, a solenoid device 14 which is fixedly connected to the housing in a manner to be essentially integral therewith. The central portion of the housing is formed with an axial bore 13A in which a main spool 15 and a poppet valve member 16 are disposed. The axial ends of the spool 15 are exposed to pilot pressure chamber FL and a feedback chamber FU. Offset springs 17A and 17B are respectively disposed in these chambers.

Fixed orifice 13Aa is at one end of pilot pressure chamber FU. The main spool 15 is formed with first and second lands 15a and 15b in a manner which defines a pressure control chamber 15c therebetween. The valve body 13 is formed with a supply port 12s, a drain port 12r and pressure output port 12o. Poppet valve element 16 moves into and out of valve seat 13B in bore 13A to define a variable orifice 13Ba. The valve seat 13B cooperates with the fixed orifice 13Aa to define a pressure chamber C which is in constant fluid communication with the pilot pressure chamber FU. The supply port 12s communicates with the pressure chamber C by way of a transfer passage 13s while the drain port 12r communicates with the poppet valve side of the valve seat 13B by way of transfer passage 13t. Additionally, the output port 12o fluidly communicates with the feedback chamber FL by way of an axially extending transfer passage structure 15f which is defined in the body of the spool 15.

On the other hand, the solenoid arrangement has a plunger 14A which is motivated by electromagnetic coil 14B. Depending on the level of energization of the coil 14B the plunger 14A is moved in a manner which drives the poppet valve element 16 toward the valve seat 13B and thus varies the amount of hydraulic fluid which is permitted to pass out of the chamber C and flow toward the drain port 12r and thus enables the pressure prevailing in the pilot chamber FU to be controlled.

Figure 4:
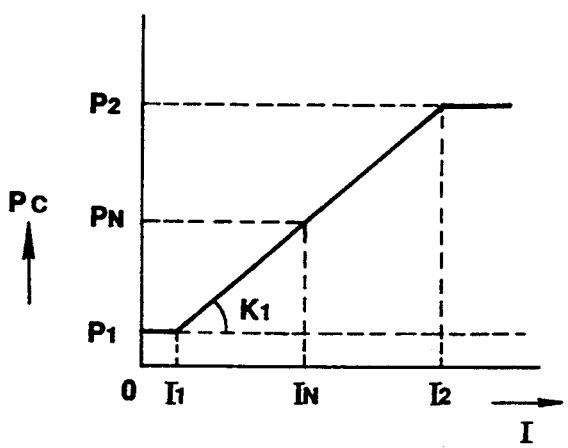
FIG. 4 is a graph of the operation characteristics of the control valve shown in FIG. 3.

Depending on the amount of force which is produced by the solenoid 14 and the resulting displacement of the poppet valve element 16, the pressures prevailing in the chambers FL and FU can be controlled in a manner wherein the spool 15 can be moved to positions wherein communication between the supply port 12s, the output port 12o and the drain port 12r can be selectively modified/cut-off; viz., as the pressures in the chambers FL and FU are varied, the pressure modulation action of the spool 15 is controlled so the pressure at the output port 12o is varied as indicated graphically in FIG. 4.

In this arrangement accelerometers 19A, 19B and 19C are arranged to output signals YG, XG and ZG respectively indicative of lateral, fore/aft and vertical accelerations of the automotive vehicle. These G signals are supplied to a vehicle posture control circuit 18 where they are modified with predetermined gains (e.g. K1 in FIG. 4) in a manner which enables roll, pitch and bound to be attenuated via determining the appropriate pressures which need to be supplied the hydraulic cylinders associated with the vehicle suspension and issuing the appropriate solenoid energization signals.

In FIG. 2, coil spring 22 is operatively disposed between the vehicle chassis 2 and the illustrated road wheel 4; while control valve 24 and pressure accumulator 26 respectively form vital parts of the suspension.

The source 8 of hydraulic fluid under pressure includes a tank or reservoir 30, an induction conduit 32 which leads to the induction ports of a pump arrangement 34. Pump arrangement 34 is placed in drive connection with the vehicle engine 36 by drive shaft 36A. Pump arrangement 34 includes first and second pumps 34A and 34B each having plural cylinders and plungers. The first pump 34A has a larger displacement than pump 34B.

Figure 5:
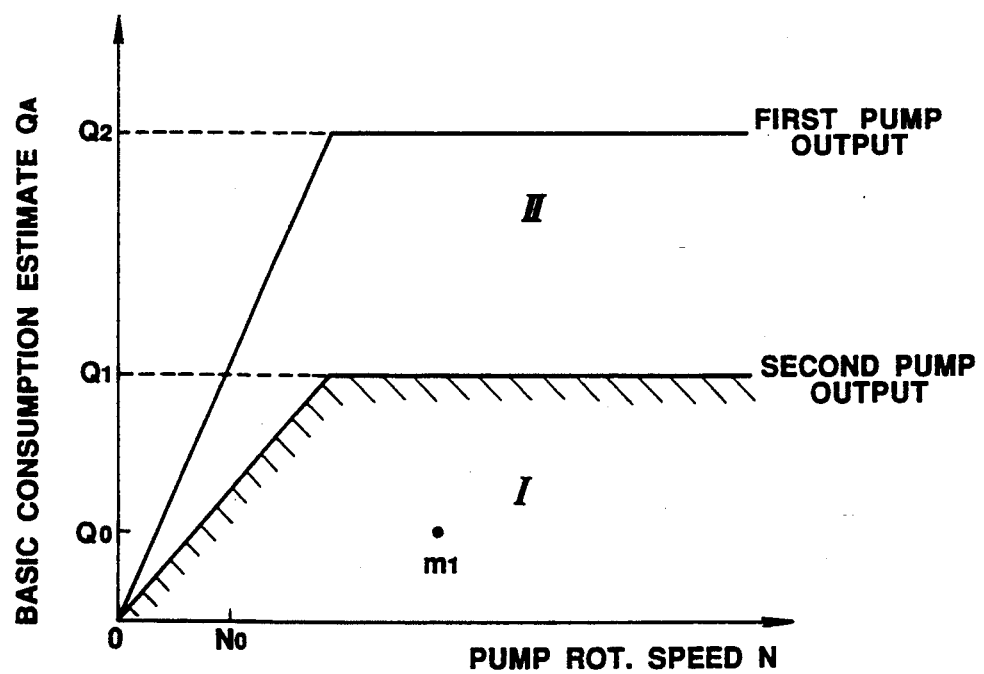
FIG. 5 is a mode control map used with a first embodiment of the present invention.

The output characteristics of the pump arrangement are graphically shown in FIG. 5. When the demand for hydraulic fluid under pressure is low, such as when the vehicle is at standstill or the vehicle posture is undergoing little change, e.g. while travelling in a straight line along a smooth surface, the output Q1 of the first pump 34A is used, while in the event that the demand for hydraulic fluid is increased the output Q2 of the larger pump 34B is used.

The discharge port of the first pump 34A communicates with a first supply conduit or passage 38a. This conduit communicates with the supply port 12s of each pressure control valve 12 by way of first and second check valves 39A and 39B. The drain port 12r of each valve 12 communicates with a drain conduit 40. An operate check valve 41 disposed in conduit 40 is responsive to a pilot pressure to open and cut-off the drain conduit 40 in response to the situation wherein PP≦PN (wherein PP denotes pilot pressure and PN denotes the pressure currently being used).

The second pump 34B has a discharge port communicating with a second supply conduit or passage 38b in which a third check valve 39C is disposed. Second supply conduit 38b communicates with the first supply passage 38a between check valves 39A and 39B.

Pressurized hydraulic fluid source 8 further includes a three-port, two-position spring offset type electromagnetic valve 42. Valve 42 has a first port 42a in communication with line 38a via first drain conduit 44, a second port 42b in communication with line 38b via second drain conduit 46 and a third drain port 42c in communication with third drain conduit 48 which leads to a reservoir 30.

A discharge control circuit 50 is connected with the electromagnetic valve 42 and arranged to supply ON/OFF type mode control signal CS to a solenoid (no numeral) of valve 42. When CS is OFF the spool of the electromagnetic valve 42 assumes a position wherein port 42a is placed in communication with port 42c and port 42b is blocked. This places conduits 44 and 48 in communication and drains the output of the larger pump 34A. On the other hand, when CS is ON the spool is moved to a position wherein port 42b is placed in communication with port 42c and port 42a is blocked. This places conduits 46 and 48 in communication and allows the output of the smaller pump 34B to be drained.

A relatively large capacity accumulator 52 communicates with the first supply passage 38a at a location downstream of the second check valve 39B.

A relief valve 53, arranged to open upon the pressure of line 38a exceeding a predetermined level, communicates with the first supply conduit 38a at a location between the first and second check valves 39A and 39B and downstream of the location where the second supply conduit 38b joins the first one. Relief valve 53 relieves excess pressure of line 38a into the drain conduit 40.

A vehicle speed sensor 54, a pump rotational speed sensor 56, a temperature sensor 57 and front left and right stroke sensors 58FL and 58FR (which are associated with the front left and right road wheel suspension arrangements) are arranged to input data to the discharge control valve circuit 50. In this case the pump rotational speed sensor 56 is arranged to respond to the rotational speed of the pump drive shaft 36A and to produce an electrical pulse train signal N indicative of the same. More specifically, this sensor can take the form of a magnetic or optical type sensor which generates a train of pulses the frequency of which increase with rotational speed. The stroke sensors can take the form of potentiometer type arrangements and are arranged to produce displacement signals XL and XR respectively.

Figure 6:
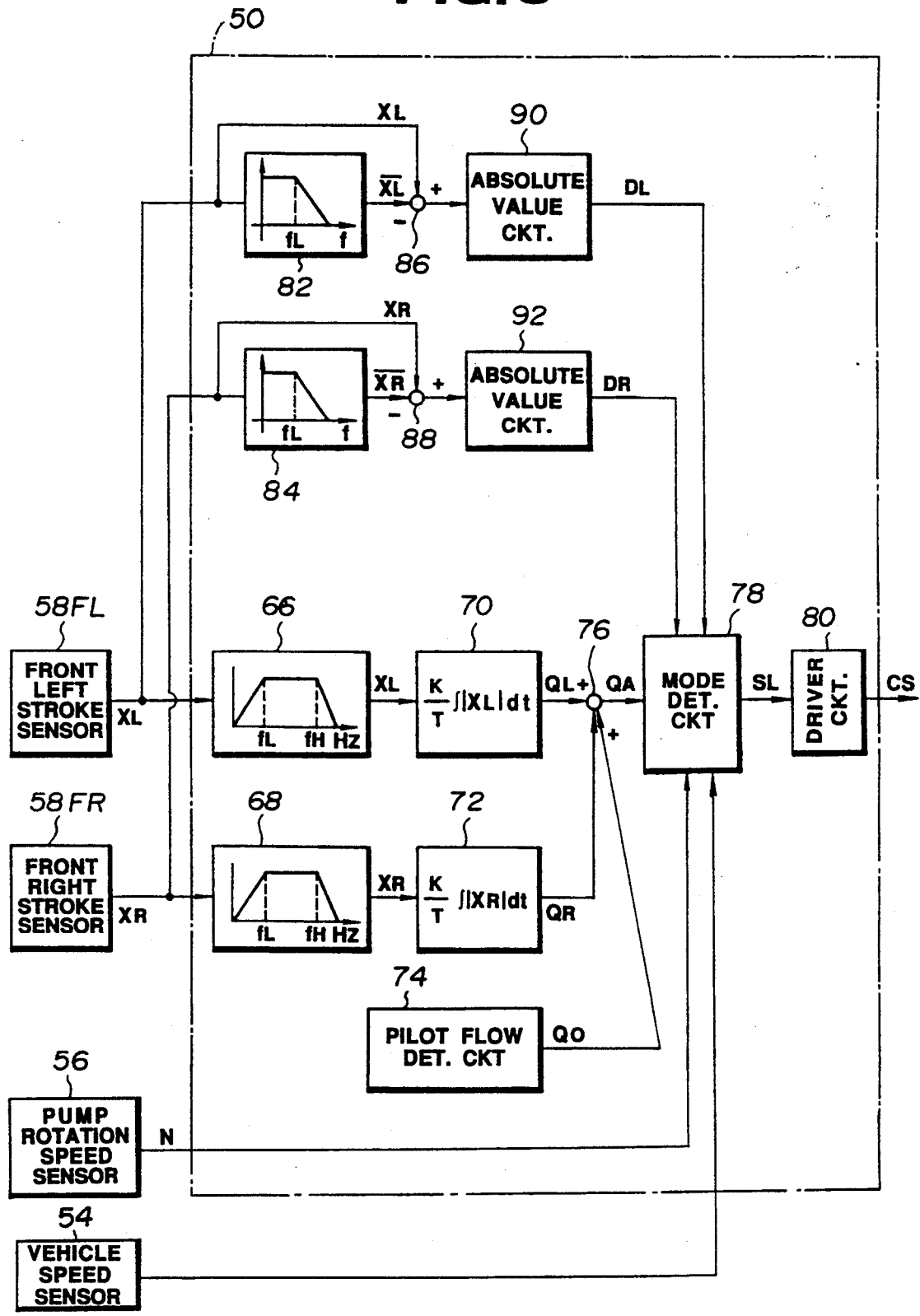
FIG. 6 is a block diagram of the conceptual arrangement of a control circuit used in the first embodiment of the present invention.

As schematically shown in FIG. 6, the outputs XL, XR of the stroke sensors 58FL and 58FR are filtered in band pass filters 66, 68 and then integrated in integrators 70, 72. The outputs QL, QR of the integrators 70, 72 (which are indicative of flow amounts) are supplied along with a signal Qo indicative of the minimum required flow (generated by a pilot flow determining section or circuit 74) to an adder 76. The output QA of the adder represents a basic or standard estimate of the total amount of hydraulic fluid which is going to be required in view of the instant operating conditions. The signal QA is used in a mode determining circuit 78 in combination with the pump 34 rotational speed signal N, and the vehicle speed signal V to determine which mode of valve operation is required in order to relieve the appropriate amount of hydraulic fluid. Depending on the outcome of this decision, a suitable command signal SL is issued to a driver circuit 80 to derive the required level for signal CS. The band pass filters 66, 68 are arranged such that the lower cut-off frequency fL is set at a value (e.g. 0.5 Hz) which changes in stroke due to vehicle height adjustment; the upper cut-off frequency is set at a value (e.g. 6 Hz) which decouples so changes in stroke at sub-resonance frequencies of spring 22 are decoupled from the filter output.

Integrators 70, 72 respond to inputs thereof in accordance with the following basic equation:

$$Q = \frac{K}{T} \int_0^T |x| dt \qquad (1)$$

That is to say, the absolute value of stroke change is integrated over a period T (e.g. 2 sec) so that the amount of hydraulic fluid which must be supplied to each cylinder can be determined based on the total stroke amount:

$$[1/T \cdot \int |x| dt]$$

In the above equation K denotes the hydraulic cylinder pressure receiving area gain.

It should be noted that in connection with the sensed relative movement which takes place between the chassis and the road wheels the movement includes both retraction and elongation. However, as will be appreciated, it is necessary to introduce hydraulic fluid under pressure from the pump arrangement only during extension. Thus, during retraction, hydraulic fluid is exhausted from the cylinder chambers L and chambers L do not require hydraulic fluid to be supplied to them at this time. However, as the same situation holds for the rear wheels, the total stroke as derived using the above mentioned equation (1) is indicative of the total stroke requirement for all four wheels.

The pilot flow amount Q derived from pilot flow determining section 74 is such as to suitably compensate for the hydraulic fluid which is lost by way of leakage in the pressure control valve 12.

By summing the QR, QL and Qo values a basic estimate Qa of the total amount of hydraulic fluid which will be consumed by the system is derived.

As shown in FIG. 6, the discharge control circuit 50 further includes low pass analog filters 82 and 84 which receive the stroke signals XL and XR and produce average values $\overline{XL}$ and $\overline{XR}$. The cut-off frequencies of low pass filters 82 and 84 are set at a value (e.g. 0.1 Hz) which is lower than the sprung/unsprung stroke frequency range (e.g. 1–10 Hz) caused by vibration which is transmitted from the road surface.

The XL and $\overline{XL}$ values and XR and $\overline{XR}$ values are subtracted in subtracters 86 and 88 respectively, which derive difference signals [XL−$\overline{XL}$] and [XR−$\overline{XR}$] that are supplied to absolute value circuits 90 and 92, that derive absolute value signals |XL−$\overline{XL}$| and |XR−$\overline{XR}$|. The output signals of circuits 90 and 92 are supplied to the mode determining circuit 78. Mode determining circuit 78 includes a microprocessor equipped with a memory (e.g. ROM) storing a mode map as shown in FIG. 5.

Figure 7:
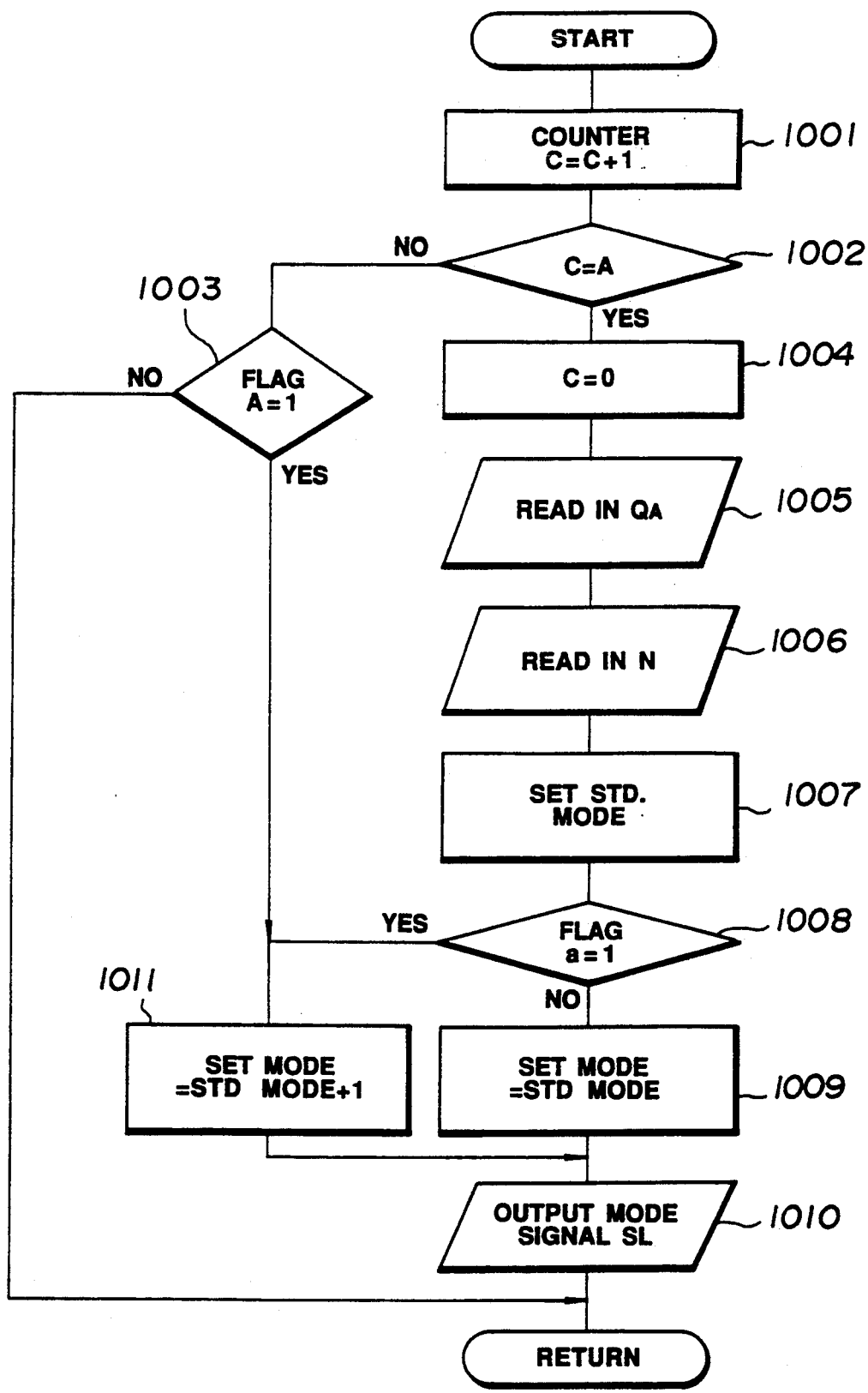
FIGS. 7 and 8 are flow charts of steps executed in accordance with control routines of the present invention.
Figure 8:
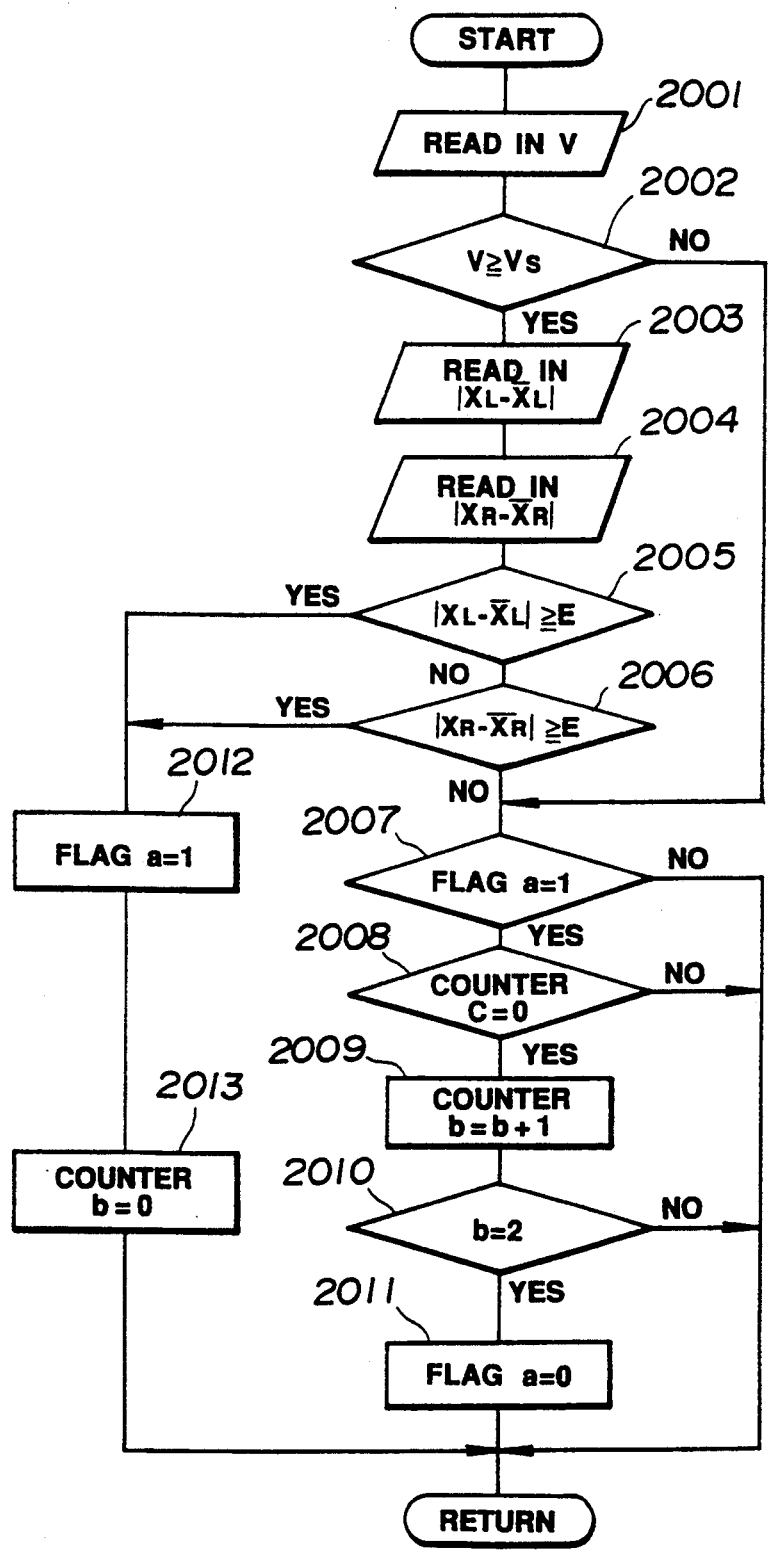

FIGS. 7 and 8, together, form a flow diagram indicating operations performed by the microprocessor of mode determining circuit 78. The steps of the microprocessor are run at predetermined time intervals $\Delta t$ ($<T$). The pump mode control routine of FIG. 7 sets the required mode in synchronism with the integration period T. In this case mode I is such that the output of the second pump 34B is supplied (large pump 34A is drained) and, mode II is such that the output of the larger pump 34A is supplied (small pump 34B is drained).

OPERATION

The operation of the mode determining circuit 78 is such that at predetermined intervals $\Delta t$—for example 20 msec the routines shown in FIGS. 6 and 7 are run via timer interrupt. It will be noted that the flags a, counters b and c and an amplification variable $\beta$ are reset to zero by the main program each time the necessary calculations are completed.

More specifically, the first 1001 step of the FIG. 6 routine is such as to increment a counter of the microprocessor. At step 1002 the count of counter c is compared with a value A to determine if the integration time T has lapsed or not (viz., $T=\Delta t\cdot A$). In the event that the c count has not reached A the routine goes across to step 1003 wherein the status of a flag a is determined. As will become more apparent infra, flag a indicates if either of the two sensed stroke amounts is above or not above a predetermined level or if a mode hold timer (initiated in response to the predetermined level being exceeded) has not yet expired.

In the event that flag a has not yet been set, the routine returns and the operating mode is not changed.

If during step 1002 it is found that the count of counter c=A, the routine goes to step 1004 wherein a counter c is cleared to zero, thence to steps 1005 and 1006 wherein the values of QA and N (basic consumption estimate and pump speed) are read.

Next, in step 1007 the QA and N data are used to perform a table look-up using mapped data of the nature illustrated in FIG. 5. Depending on which of modes I and II is best suited for the present QA, N situation (viz., the "standard" mode), the routine goes to step 1008 wherein the status of flag a is checked. If flag a has not been set, the routine goes to steps 1009 and 1010 wherein the mode which was determined in step 1007 is set as the instant mode of operation and the appropriate SL signal level is selected and supplied to an output. In this instance SL=0 induces mode I and SL=1 induces mode II.

On the other hand, if it is found in either of steps 1003 or 1008 that flag a has been set, the routine goes to step 1011. If the routine is proceeding from step 1003, the instant mode of operation is upgraded by one rank. If the routine is proceeding from step 1008, the mode selected in step 1007 is upgraded and set as the instant mode. The routine then goes to step 1010 wherein the appropriate SL signal level is set and supplied to an output.

Because there are only two modes from which to select, if flag a is set the routine will go to step 1011 and invariably cause mode II to be selected. If the routine is directed to step 1003 during step 1002 and flag a is set (flag a=1) and mode II has already been selected and is being implemented, mode II is maintained. On the other hand, if mode I is being implemented, the mode is upgraded to mode II without the need to pass through steps 1004–1008.

The routine shown in FIG. 8 is run at predetermined intervals via timer interrupt and is such that in step 2001 the instant vehicle speed value V is read in and in step 2002 the instant vehicle speed is compared with a predetermined slice value Vs. In the event that V<Vs the routine goes to steps 2003 and 2004 wherein |XL−$\overline{XL}$| and |XR−$\overline{XR}$| are read in from the absolute value circuits 90 and 92. In step 2005 the present |XL−$\overline{KL}$| value is compared with a predetermined stroke slice level value E. If |XL−$\overline{XL}$|<E, the routine goes to step 2006 wherein the |XR−$\overline{XR}$| value is compared with the same E value. In the event that both of the absolute values are below E the routine proceeds to step 2007 wherein the status of flag a is checked. If flag a has not been set, so F=0, the routine returns. On the other hand, if the flag a has been set so F=1 the routine proceeds to step 2008 wherein the status of counter c (incremented in step 1001) is checked. If c>0 the routine proceeds to step 2009 wherein counter b is incremented. Next in step 2010 a determination is made as to whether or not the count of counter b has reached 2. This provision ensures that (1) the routine passes through steps 2007–2010 twice and (2) following the end of detection of a relatively large stroke the instant mode is maintained for at least time T (i.e., $T=\Delta t\cdot A$).

In other words, in the event that step 2010 renders a negative outcome, it is deemed that counter c has not clocked up to A and been cleared twice (steps 1001, 1002 and 1004) and a hold time Tf+T (0≦Tf<T: Tf) has not yet been exceeded and the routine is directed to bypass step 2011. Upon counter b reaching 2 the routine is directed to return via step 2011 wherein flag a is cleared.

On the other hand, if it is found that either of the |XL−$\overline{XL}$| or |XR−$\overline{XR}$| values exceeds E in steps 2005 and 2006, the routine proceeds to steps 2012 and 2013 wherein flag a is set in order to flag the occurrence of |XL−$\overline{XL}$|>E and/or |XR−$\overline{XR}$|>E and counter b is cleared so b=0.

The operation of the overall arrangement is such that when the vehicle is traversing a smooth road at a steady velocity below the slice level value Vs, the operate check valve 41 is open, causing the supply and drain conduits to be in communication and relief valve 53 to function to control the level of the pump discharge to a predetermined line pressure level.

Under these conditions, V<Vs and the routine is not permitted to proceed through steps 2003 and 2004 and setting of flag a is prevented. Assume that at the same time the vibration which is transmitted to the chassis from the road surface induces a very small change in the amount of stroke. Under this assumption, the outputs XL and XR of the stroke sensors 58FL and 58FR exhibit almost no change, and the output components of the band pass filters 66, 68 have values close to zero. As a result QA≃Qo. This results in selection of operation mode I. If flag a=0, the pump control routine shown in FIG. 7 goes to step 1009 wherein mode I is set as the mode of operation. As a result, SL is set to "0", causing CS to have an OFF level. As will be appreciated, this results in draining of the output of larger pump 34A and the use of the smaller pump to develop the line pressure level.

If the vehicle goes from a good smooth road surface to one which continuously undulates, the vehicle is subject to a vertical vibration having a frequency which is lower than the resonance zone of the sprung mass, causing the average stroke value of at least one front wheel to exhibit characteristics of the nature depicted in FIG. 9(a). As will be appreciated from this time chart, at time t1 the displacement x is approximately at the average value and relatively slowly rises to a level where the slice level E is exceeded. At time t2 the displacement exceeds the slice level.

When this type of stroke characteristics is encountered, so V<Vs and flag a=0, the outputs of the band pass filters 66 and 68 are integrated in the integrators 70 and 72 during the integration period T. In addition, the total stroke amounts, derived as signals QL and QR, accordingly increase in value. The output QA of the adder 76 is read into the mode setting circuit 78 each time period T expires. At step 1007 the mode which is most appropriate is determined based on the read in value of QA. The routine shown in FIG. 8 is such that while the vehicle speed is below Vs. In addition, the setting of flag a is prevented and the pump control routine is such as to cause operation to proceed from step 1007 to step 1009. The mode is set in accordance with the mode selected in step 1007. Viz., at this vehicle speed, the rate at which the displacement varies is low and it is not necessary to boost the supply of hydraulic fluid to the active suspension and the basic or standard consumption estimate suffices.

On the other hand, when the vehicle speed rises above the slice level (Vs), flag a can be set. However, while the vehicle is running on a smooth surface the stroke amount is close to zero and flag a is not set.

However, if the vehicle moves off the good road surface onto one which undulates, at least one of the road wheels 4 has a stroke as depicted in FIG. 9(b). Viz., at time t1 the displacement X begins to rise rapidly and exceeds the slice level E during the period t11-t12. Until time t11, both $|XL-\overline{XL}|$ and $|XR-\overline{XR}|$ are less than E, and flag a is maintained at 0. During this time any hydraulic fluid required in excess of that being produced by pump 34B is supplied by accumulator 52.

However, during the time period t11-t12 at least one of $|XL-\overline{XL}|$ and $|XR-\overline{XR}|$ exhibits a value greater than E and flag a is set so F=1. This induces the routine in FIG. 8 to pass through step 1011 and upgrade the mode of operation. As is apparent from the above description, the routine has two possible ways to reach step 1011. In the event that counter c has just reached a count A, the routine proceeds via steps 1004–1008 and from step 1008 to step 1011. However, in the event that this timing is not achieved, the routine goes to step 1003 and from there directly to step 1011.

It will be noted that with the instant embodiment, a mode up command is generated immediately after the time t11 so the delay that tends to be encountered with the prior art arrangements which use vertical acceleration as a control parameter, is obviated.

Following time t12, when $|XL-\overline{XL}|$ and $|XR-\overline{XR}|$ both tend to be below E, the mode up control is maintained during time interval t12-t13 (viz., a period of Tf +T). Following time t12 the displacement reduces and then assumes a negative value. From time t13 to t21 the displacement exceeds the negative slice level (−E). During this time interval, the routine shown in FIG. 8 is executed through step 2013, causing clearing of counter b. This renews the hold time and a new Tf+T time is initiated. As a result, the instant mode of operation continues to be maintained at mode II.

When the displacement diminishes in the manner depicted in the latter half of FIG. 9(b), at time point Tn1 the displacement falls below the slice level and remains there until time point tN+2. Under these conditions the hold time Tf+T is initiated at time tN1 and is completed at time tN2. During this period while the pump output is temporarily maintained at the elevated level, accumulator 52 is recharged.

It will be noted that while the present invention is not limited to the use of only a two stroke sensor, this usage simplifies the hardware which is necessary for implementing the same. The two stroke sensor also renders the system sensitive to changes which effect hydraulic fluid consumption. By comparing the displacement with the predetermined slice level E, errors due to noise can be avoided.

SECOND EMBODIMENT

FIG. 10 is a diagram of a system to which a second embodiment of the present invention is applied. This arrangement differs from the arrangement shown in FIG. 2 because electromagnetic valve 82 used is a three port-three position valve having two solenoids. The discharge control circuit 84 is connected with the electromagnetic valve 82 and arranged to supply ON/OFF type mode control signals CS1 and CS2 to first and second solenoids. When the CS1 and CS2 signals both have low levels, the spool of the valve 82 assumes a first position wherein port 82a is blocked and communication between ports 82b and 82c is established. When CS1 is ON and CS2 is OFF, the spool assumes a second position wherein all ports are blocked. When CS1 is OFF and CS2 is ON, the spool assumes a third position wherein communication between ports 82a and 82c is established and port 82b is blocked.

Figure 11:
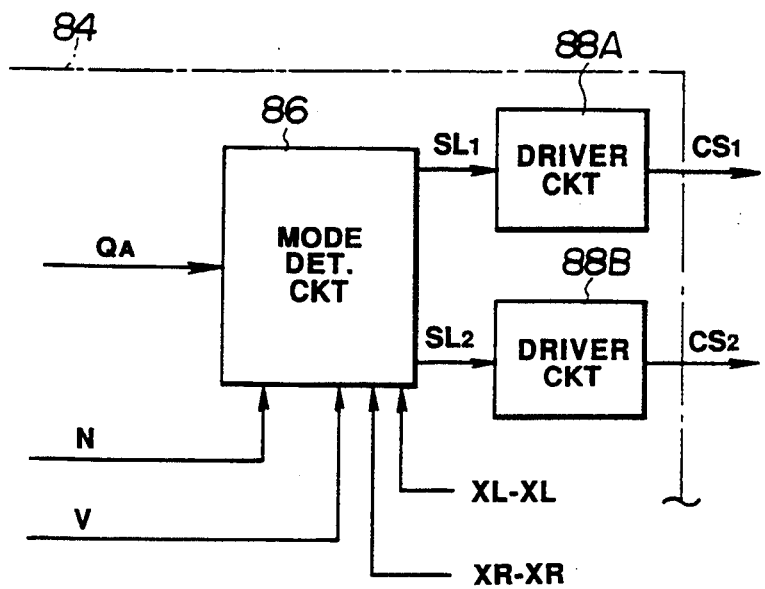
FIG. 11 is a view highlighting a portion of the FIG. 10 arrangement which is different from that shown in FIG. 2.
Figure 12:
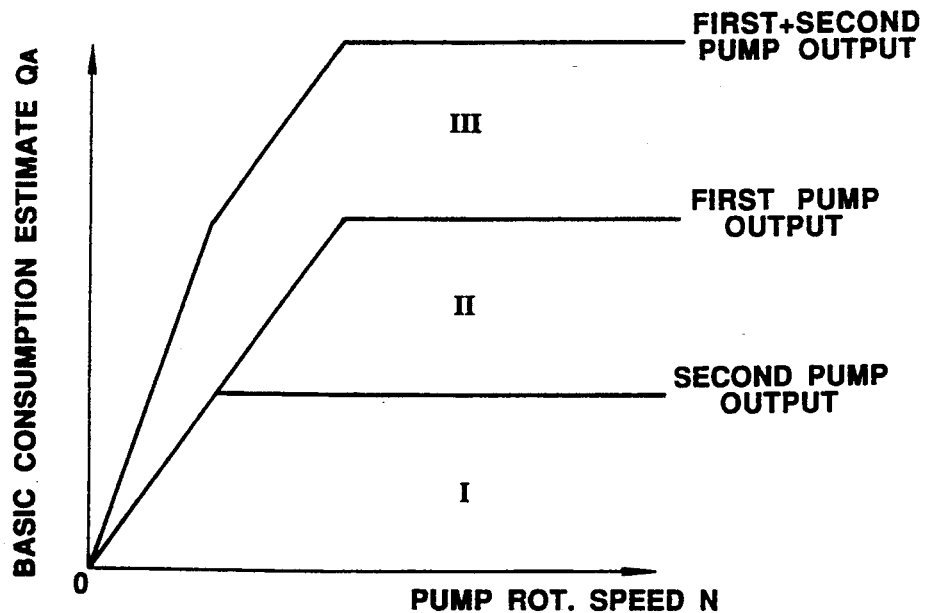
FIG. 12 is a mode control map used in connection with the second embodiment of the present invention.

In addition, the mode determining circuit 86 (see FIG. 11) is arranged to respond to the QA, N and V, $|XL-\overline{XL}|$ and $|XR-\overline{XR}|$ data inputs and supply appropriate signals SL1 and SL2 to driver circuits 88A and 88B. The latter mentioned driver circuits respectively derive first and second control signals CS1 and CS2.

Figure 13:
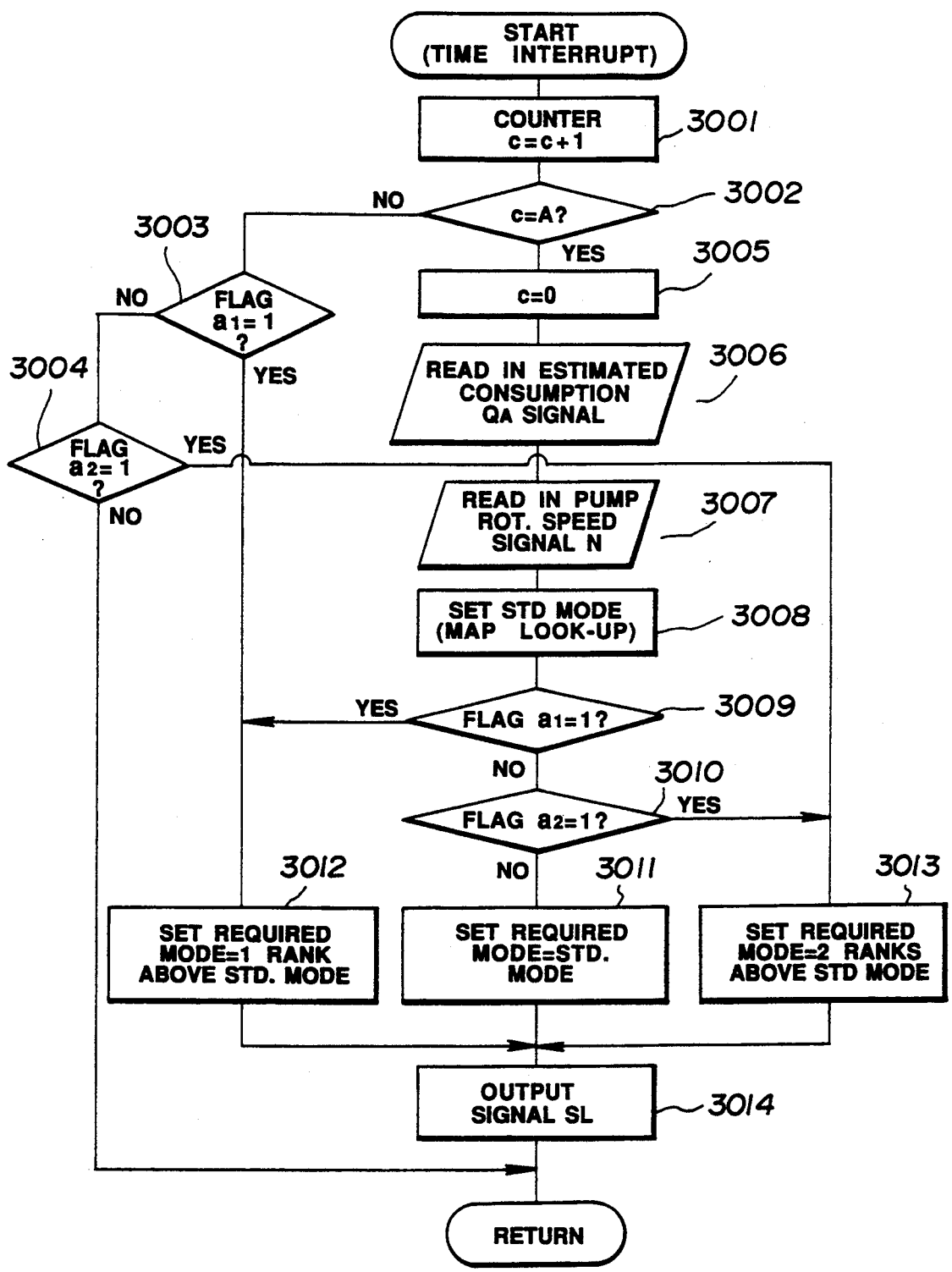
FIGS. 13 and 14 are flow charts of routines for implementing mode settings and providing controls according to the second embodiment of the present invention.
Figure 14:
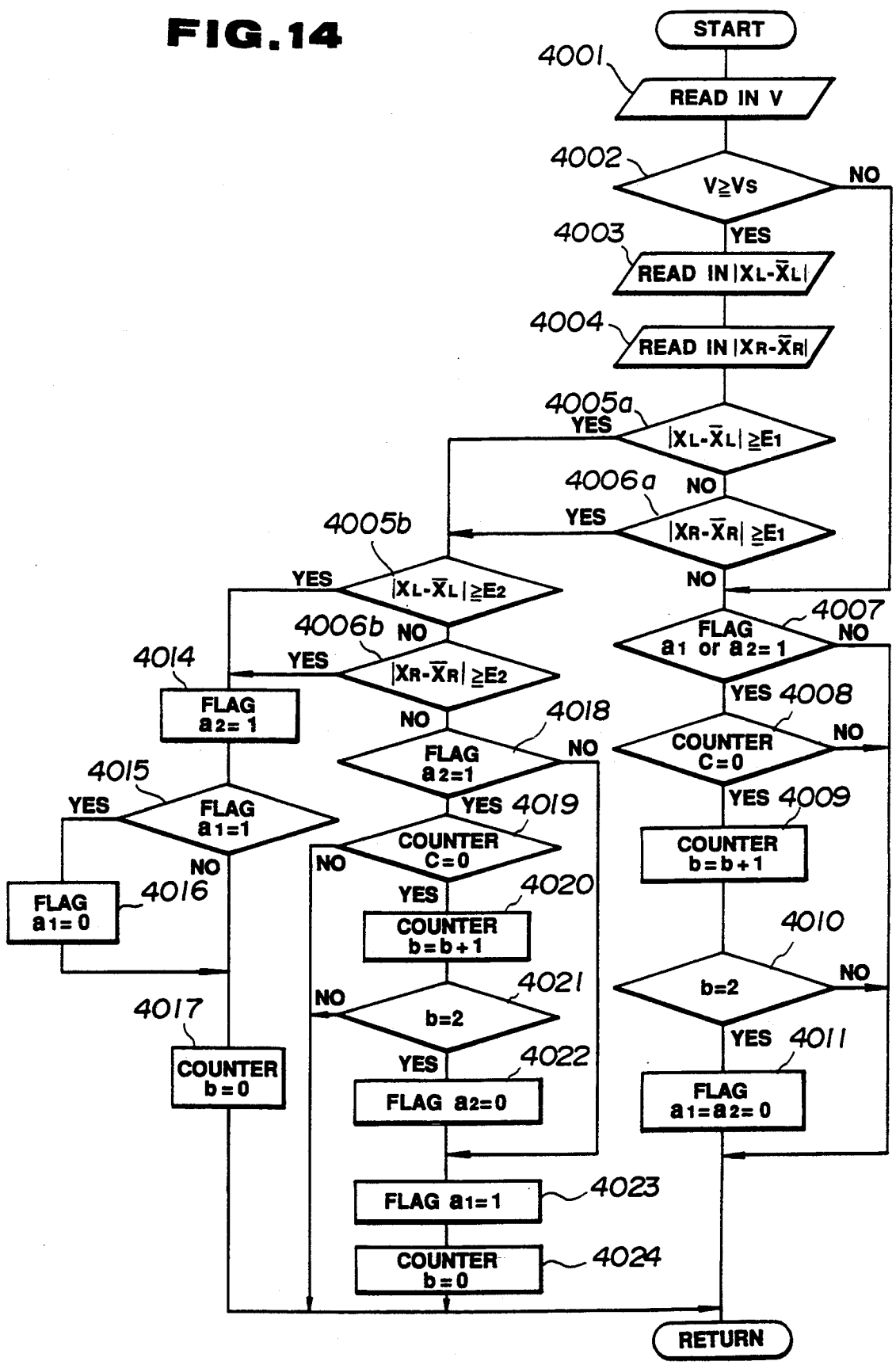

FIGS. 13 and 14 are drawings of routines executed according to a second embodiment of the invention; the routines are run in the microprocessor included in the mode determining circuit 86, at predetermined time intervals Δt (<T) arranged to determine the setting of signals SL1 and SL2 which are applied to the driver circuits 88A and 88B. The routine shown in FIG. 13 is such as to set the required mode at the same timing as the integration time expires. The flow chart shown in FIG. 14 shows the steps which characterize a flag setting routine which discriminates between large, intermediate and small amounts of suspension stroke amounts and set flags which indicate the same.

More specifically, the first step of the FIG. 13 routine is such as to increment a counter c. At step 3002 the count of counter c is compared with a value A to determine if the integration time T has lapsed or not (viz., $T = \Delta t \cdot A$). In the event that the c count has not reached A the routine goes across to step 3003 wherein the stylus of a flag a1 is determined. In the event that this flag has not yet been set, the routine goes to step 3004 wherein the status of a flag a2 is checked. Flags a1 and a2 are respectively set so a1=0 and a2=1 in the routine shown in FIG. 14 if the stroke of the hydraulic cylinder 10 exceeds and remains above a predetermined value E2 (viz., exhibits a large stroke) for a first predetermined time interval. In the event that the stroke falls within predetermined limits E2 and E1 the flags are set so a1=1, a2=0 following the lapse of the same predetermined period; if, however, the stroke is found to be less than E1 both flags are cleared (viz., a1=0, a2=0) following the lapse of a second predetermined period.

In steps 3003 and 3004, in the event that the outcome of the inquiry is negative, it is deemed that the stroke amount is small, the instant mode is maintained and the routine returns to the main program.

However, in the event of a positive (YES) outcome in step 3002, the routine goes to step 3005 wherein counter c is cleared and then proceeds to step 3006. In steps 3006 and 3007, the estimated hydraulic fluid requirement value QA and the pump rotational speed value N are read.

At step 3008, mapped data (the nature of which is shown in FIG. 4) are used with the values of QA and N (which have just been obtained) to determine which mode of operation Mo should be selected as a standard (STD) under the instant set of operating conditions.

Following this decision, the routine goes to step 3009 wherein the status of flag a1 is checked. In the event that a1=0 (viz., the flag has not been set) the routine goes to step 3010 wherein the status of flag a2 is determined. Hence, steps 3009 and 3010 are executed to determine if the stroke amount is large, small or intermediate. If both steps 3009 and 3010 exhibit negative outcomes (indicative of a small stroke amount), the routine proceeds to step 3011 wherein the STD mode determined by the look-up executed in step 3008 is set as the mode which is anticipated or "predicted" as being suitable to meet current requirements.

If the outcome of step 3009 is affirmative (indicative of an intermediate stroke amount), the routine goes to step 3012 wherein the mode is upgraded by one rank and set as the required mode M1 (viz., mode 1 is upgraded to mode 2 or alternatively mode 2 is raised to mode 3). On the other hand, if the outcome of step 3009 is negative and the routine flows to step 3010 wherein in the event of an affirmative outcome (flag a2=1), it is assumed that the stroke amount is large and the routine goes across to step 3013 wherein the STD mode Mo is upgraded by two ranks. As will be appreciated, as there are only 3 modes from which to select, step 1013 is such as to unfailingly induce the situation wherein mode 3 is elected. During step 3014, which follows the mode setting steps, signals SL1 and SL2 are derived.

The routine shown in FIG. 14 is basically similar to the flag setting routine depicted in FIG. 8. FIG. 14 differs from FIG. 8 because two stroke slice levels E1 and E2 are used to set the first and second flags a1 and a2 which are used in steps 3003 and 3004. This allows the stroke length to be classified into three zones instead of two, viz., below E1 (a1=a2=0), between E1 and E2 (a1=1, a2=0) and greater than E2 (a1=0, a2=1). The manner in which steps 4008-4011 and 4020-4024 hold the instant mode for a time following the stroke levels below the slice levels E1 and E2 is self-evident in light of the disclosure relating to the FIG. 8 routine. The division of the control into three zones enables fine control of the amount of prime power consumed by the pump arrangement and therefore enables a further improvement in prime mover fuel economy.

It will be noted that while the first and second embodiments have been disclosed as utilizing the consumption estimate QA, the present invention is not limited to such uses and it is within the scope of the same to use a predetermined mode and to induce a mode upgrade in response to detection of large stroke amounts.

THIRD EMBODIMENT

Figure 15:
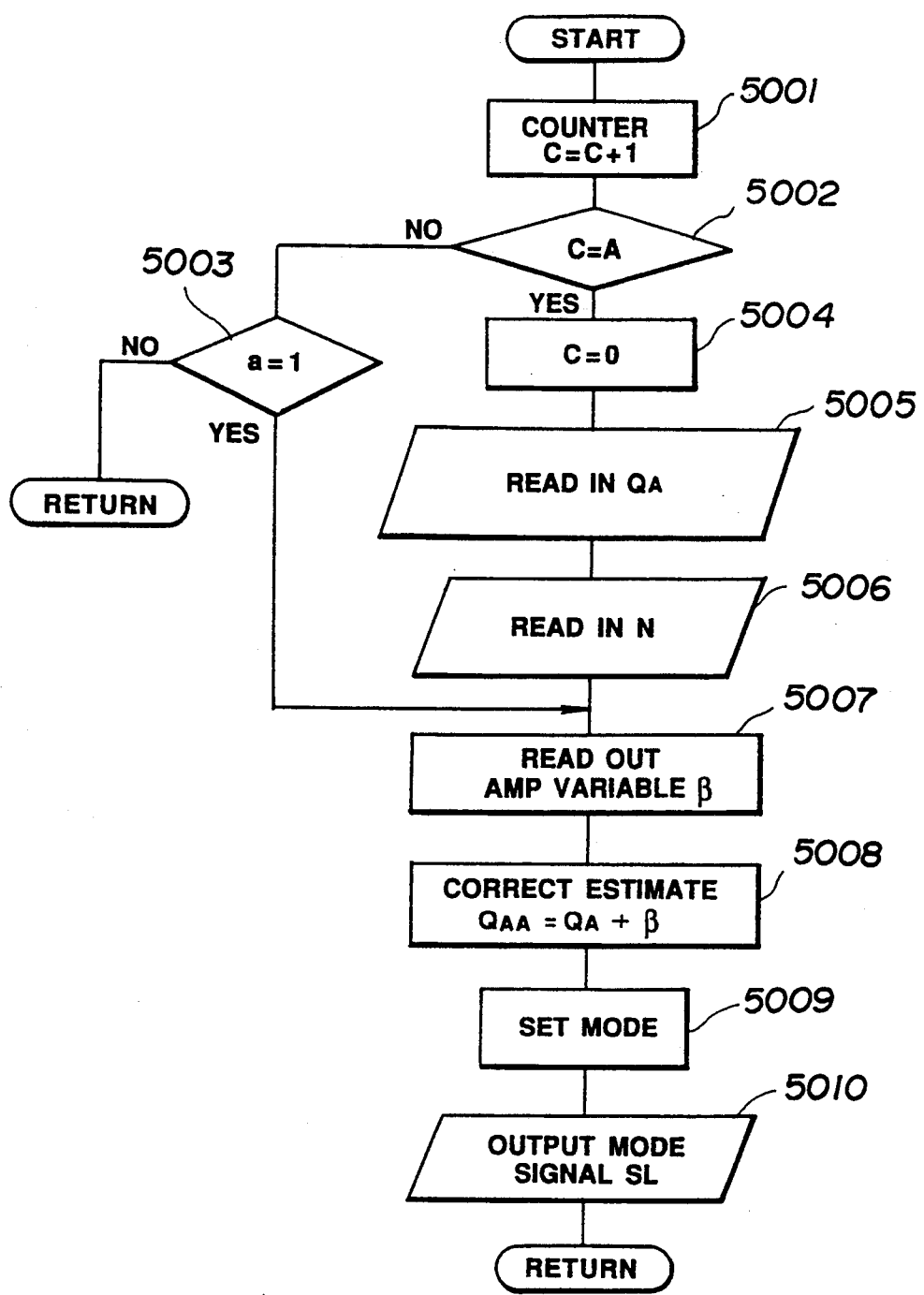
FIGS. 15 and 16 are flow charts of routines for implementing mode settings and providing controls according to a third embodiment of the present invention.
Figure 16:
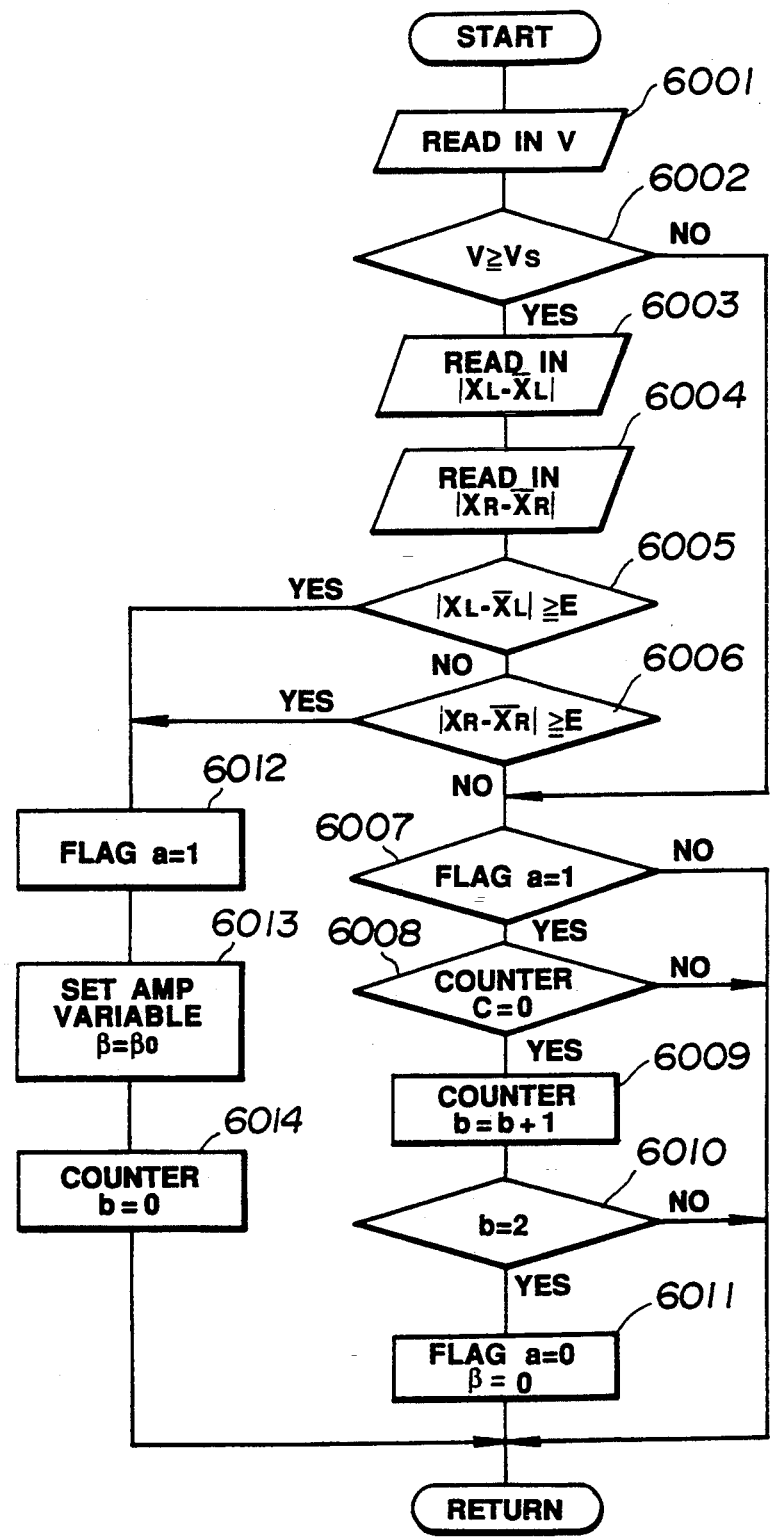
Figure 17:
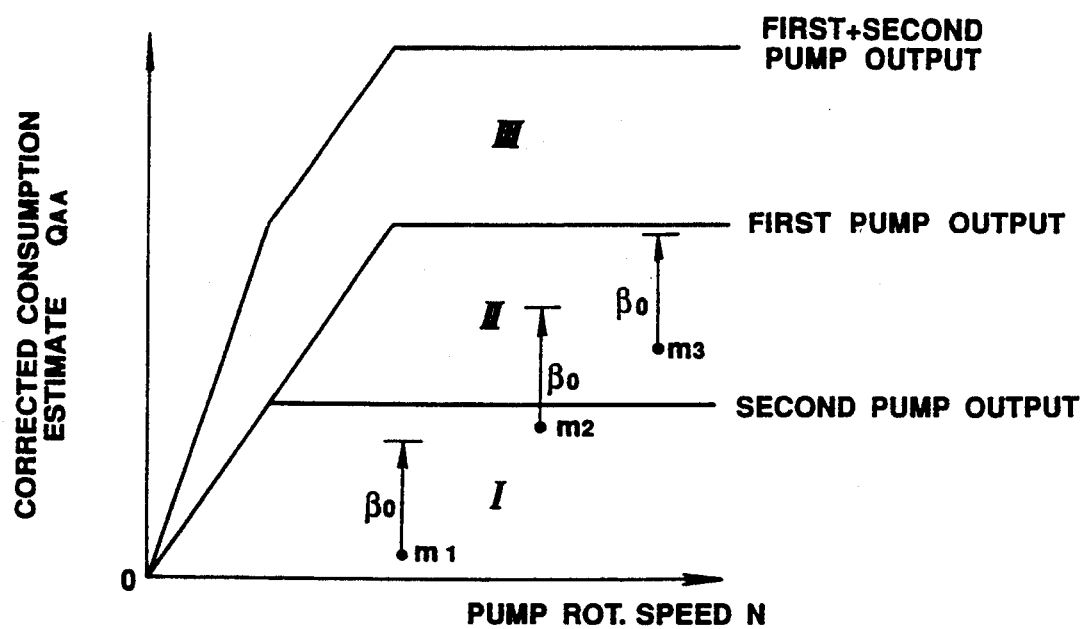
FIG. 17 is a mode control map used in connection with the third embodiment of the present invention.

In FIGS. 15-17 are disclosed the features which characterize a third embodiment of the present invention. As will be appreciated the routines shown in FIGS. 15 and 16 are basically similar to those shown in FIGS. 7 and 8 and disclosed in connection with the first embodiment. However, the third embodiment features the arrangement wherein flag a is set to 1 and an amplification variable $\beta$ is set to a predetermined level $\beta o$ in steps 6012 and 6013, respectively. Steps 6012 and 6013 are performed in response to the stroke level indicated by $|XL - \overline{XL}|$ or $|XR - \overline{XR}|$ being above a slice level E as determined during steps 6005 and 6006 read out and used in steps 5008 and 5009. In this instance the $\beta$ value is added to the QA value and the total (QAA) is used in a map look-up using data of the nature depicted in FIG. 17. In step 5009 a determination is made as to which mode should be implemented. In this instance the vehicle speed V is compared with a predetermined value or slice level Vs, flag a is setting and the amplification variable is set to $\beta o$ only if the speed is either equal to or greater than Vs.

With this embodiment the control depicted in FIG. 17 is rendered possible. If (1) the vehicle speed is above Vs, (2) the instantaneous QA and N values are such as to define point m1, and (3) the stroke amount causes slice level E to be exceeded, the amplification variable $\beta o$ is added to QA to elevate the point as shown by the arrow. In this case even though the value of QA is increased via the addition of $\beta o$ the point does not extend into the mode II zone. However, if the point is at m2 the addition of $\beta o$ causes the value of QAA to fall in upgraded mode II. If the point is at m3 the addition of $\beta o$ is not sufficient to bring the value of QAA into mode III and mode II operation continues.

As will be appreciated this prevents unnecessary mode upgrades unless the corrected QAA value is carried into the next mode zone by the addition of $\beta o$.

It should be noted that the instant embodiment is not limited to the use of a fixed $\beta o$ value and that it is within the scope of the present invention to vary the value of $\beta o$ in accordance with a selected parameter, such as (1) vehicle speed V, (2) an acceleration value detected by sensors 19A-19C as coupled to the outputs of the low pass filters 82, 84, (3) the absolute value circuits 90, 92 or the like. All that is required is that the appropriate data be mapped with a suitable resolution and a look-up operation used in step 6012.

FOURTH EMBODIMENT

Figure 18:
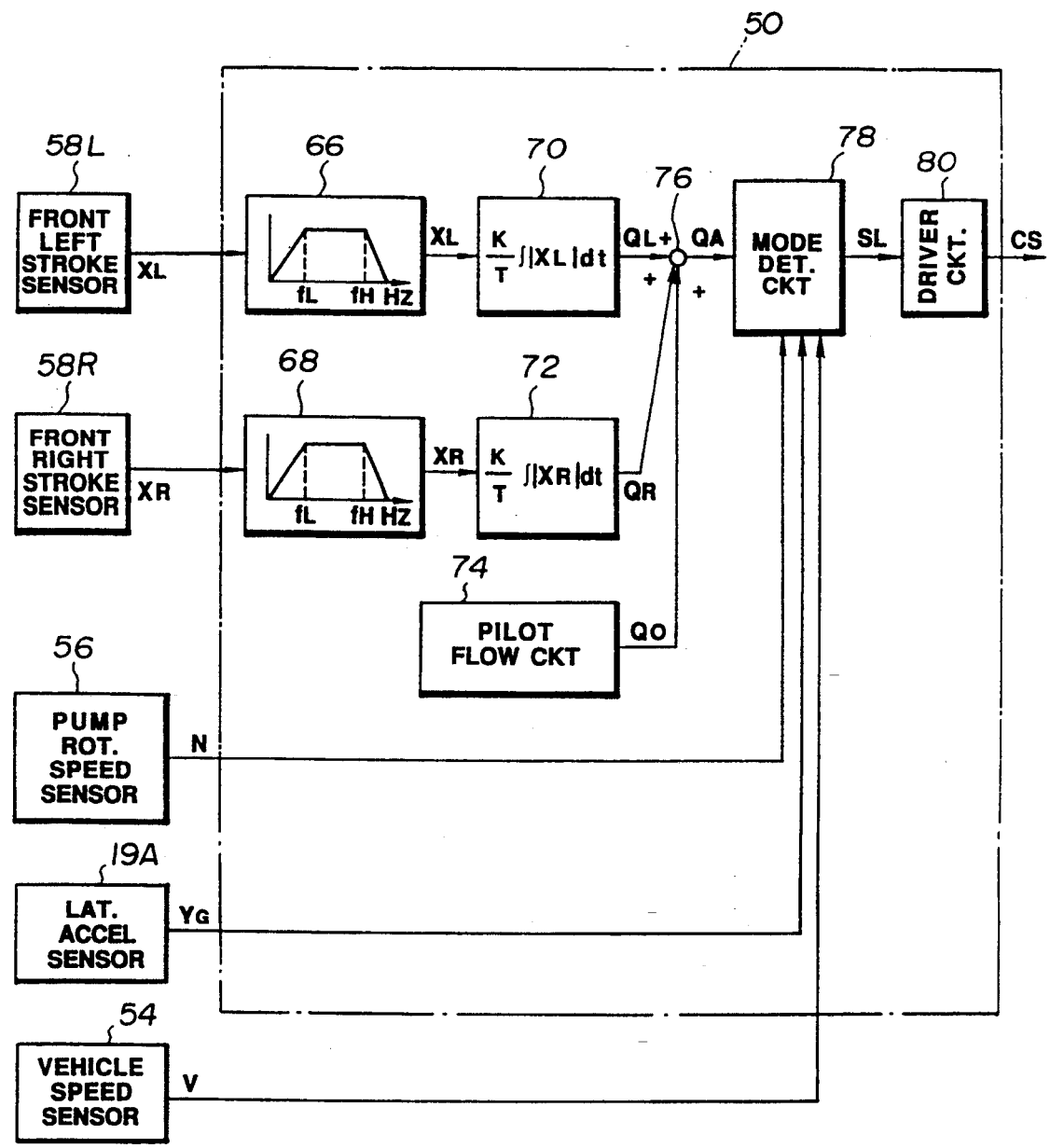
FIG. 18 is a block diagram of the conceptual arrangement of a control circuit in accordance with a fourth embodiment of the present invention.
Figure 19:
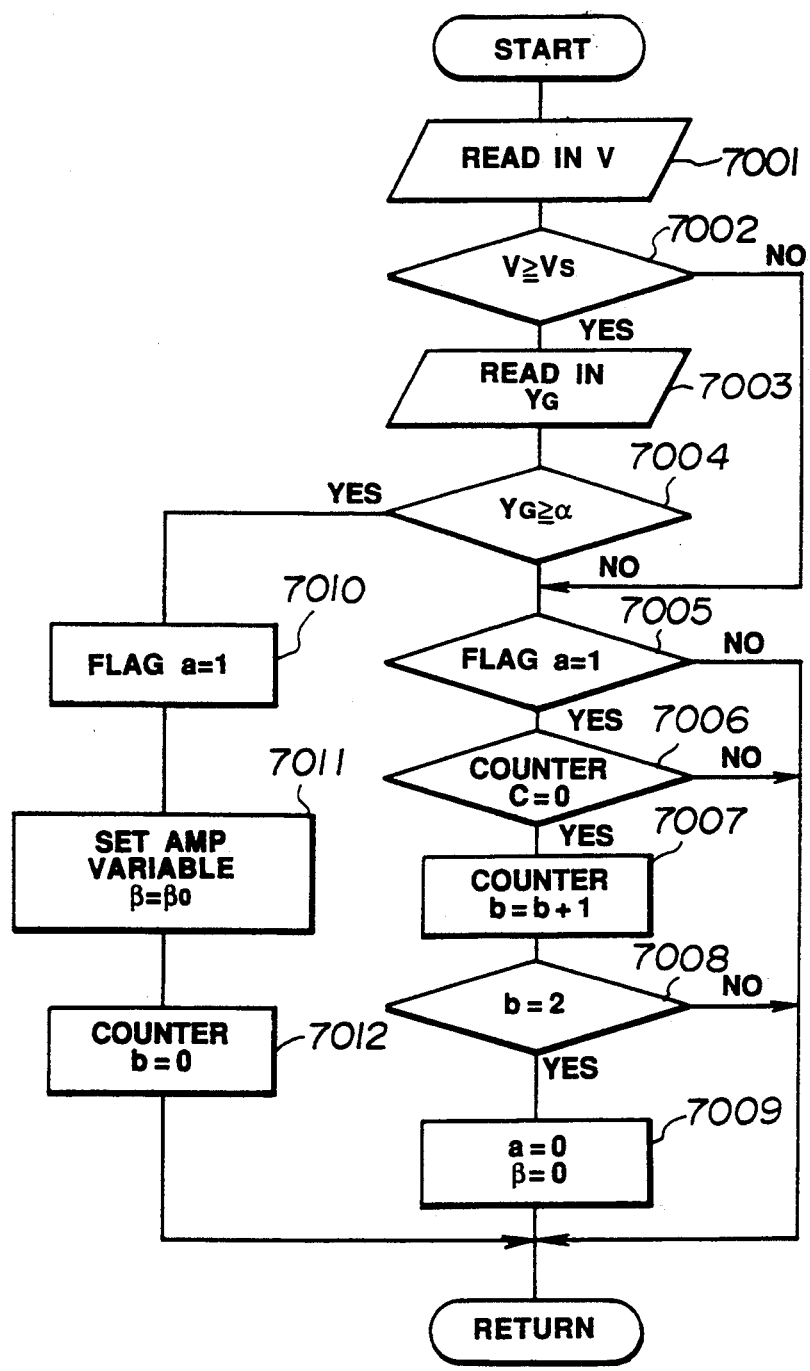
FIG. 19 is a flow chart of operations performed in accordance with the fourth embodiment.

In FIGS. 18 and 19 are shown features which characterize a fourth embodiment of the present invention. This embodiment is particularly directed to roll control and to suitable control of the supply of hydraulic fluid in response thereto.

The circuitry shown in FIG. 18 is a simplified version of that shown in FIG. 6 by failing to include the averaging and absolute value circuits. This embodiment further features the use of lateral acceleration signal YG which is derived from lateral acceleration sensor 19A.

FIG. 19 is a diagram of a routine used to set flag a and to set the magnitude of the amplification variable $\beta$ which is added to a QA value in the manner described in connection with steps 5007 and 5008 of the mode control routine shown in FIG. 15.

Figure 20:
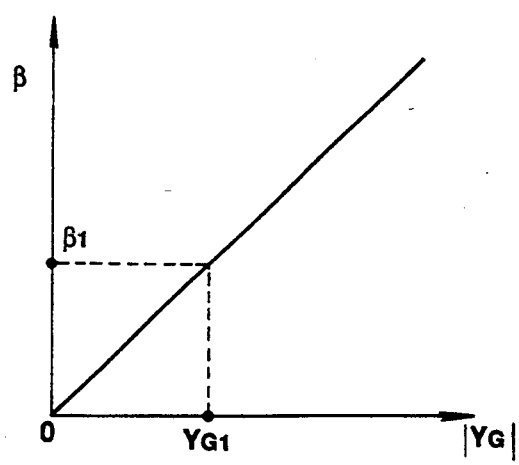
FIGS. 20 and 21 are graphs of the relationships between amplification variables $\beta 1$ and $\beta 2$ and the absolute value of lateral acceleration.
Figure 21:
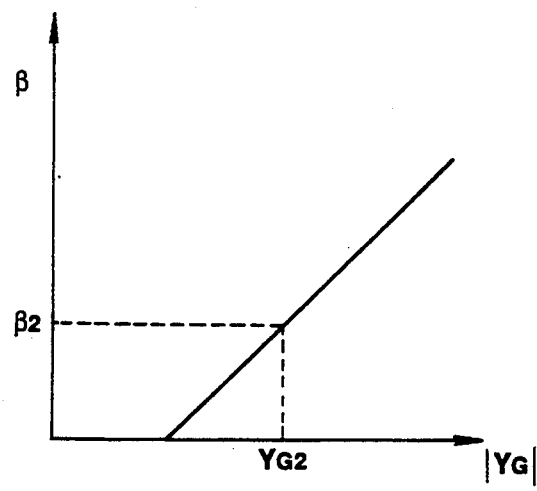

In the routine of FIG. 19 the instantaneous value of V is read and compared with a slice level Vs. If the vehicle speed is lower than Vs the routine loops to steps 6005 and checks the status of flag a. On the other hand, if $V \geq Vs$ the routine proceeds to steps 7003 and 7004 wherein the present value of YG is read in and compared with a predetermined value $\alpha$. If this slice level is exceeded the routine proceeds to step 7010 wherein flag a is set and then proceeds to step 7011 wherein the $\beta$ value is set. In this embodiment a fixed value $\beta_o$ can be set or be selected from mapped data of the nature depicted in either of FIGS. 20 or 21. Following this setting counter b is cleared and the routine returns.

On the other hand, if the $\alpha$ slice level is not exceeded, the routine goes to steps 7005–7009. As will be readily appreciated these steps are the same as steps 2007–2011 except that in step 7009 the value of $\beta$ is set to zero and flag a is cleared.

ALTERNATIVE ARRANGEMENTS

Further, while the fourth embodiment has been disclosed as being adapted to produce only two modes of pump operation, it is possible to modify the same in a manner similar to the second embodiment. In addition, the fourth embodiment is not limited to a situation wherein both speed and lateral G limits must be exceeded before the QA value is increased, and it is possible to permit the increase under conditions wherein the lateral acceleration level exceeds given limits.

As a further alternative, it is possible to eliminate the QA derivation and to use a fixed value which is suited for good road surfaces in lieu thereof.

The present invention is not limited to 2 and 3 stage variable pump arrangements and infinitely variable type pumps can be used to increase the resolution with which the supply can be adjusted.

Other variations are possible without departing from the scope of the present invention as will be apparent to those skilled in the art.

What is claimed is:

1. A hydraulic fluid supply system for an automotive vehicle comprising:

variable displacement pump means fluidly coupled with a hydraulically-operated servo device for supplying hydraulic fluid under pressure thereto; said pump means having first and second volumetric modes at which fluid is supplied to the servo device, said second volumetric discharge mode providing a maximum volumetric discharge amount to the servo device that is less than the maximum volumetric discharge amount to the servo device of said first volumetric discharge mode;

a stroke sensor for producing a relative displacement signal representative of relative displacement between a chassis of the vehicle and a road wheel of the vehicle;

means responsive to the displacement signal for deriving a basic estimate of the volume of hydraulic fluid required to be supplied to the servo device on the basis of the amount of displacement between the chassis and the road wheel;

a first sensor for sensing a first predetermined parameter which varies with the operation of the servo device;

a discharge mode determining means responsive to the value of said basic estimate for selecting one of the first and second discharge modes as a standard discharge mode;

a vehicle speed sensor;

said discharge mode determining means being responsive to the sensed first predetermined parameter for increasingly shifting the discharge mode of the pump from said selected standard discharge mode in response to the first predetermined parameter exceeding a predetermined threshold value; and said discharge mode determining means being responsive to the vehicle speed as sensed by the vehicle speed sensor for selectively inhibiting the increases in shifts of the pump discharge mode and for setting said selected standard discharge mode as a final discharge mode of the pump when the vehicle speed as sensed by the vehicle speed sensor is below a predetermined level.

2. A vehicular hydraulic fluid supply system according to claim 1 wherein a pilot flow determining circuit supplies a value to the means for processing and calculating, which value indicates an amount of hydraulic fluid for compensating the amount of fluid lost by way of leakage.

3. A vehicular hydraulic fluid supply system according to claim 1 wherein said variable displacement pump means comprises first and second synchronously-driven pumps and valve means for selectively draining the outputs of the first and second pumps, the first pump having a displacement which is larger than the second pump.

4. A vehicular hydraulic fluid supply system according to claim 1 wherein said hydraulically-operated servo device comprises an active vehicle suspension including a hydraulic cylinder having a variable volume working chamber into which hydraulic fluid is supplied from said variable displacement pump means.

5. A vehicular hydraulic fluid supply system according to claim 1 wherein said first sensor includes a sensor for monitoring lateral acceleration exerted on the vehicle body.

6. A vehicular hydraulic fluid supply system according to claim 1 wherein the stroke sensor includes the first sensor and further including means for processing the signals of the stroke sensor and supplying the processed signals to the correction means.

7. A vehicular hydraulic fluid supply system according to claim 6 wherein the processing means comprises a low pass filter and averaging means, a subtracting means and an absolute value means.

8. A vehicular hydraulic fluid supply system according to claim 1 wherein said processing and calculating means includes a means for integrating the signals of the stroke sensor.

9. A vehicular hydraulic fluid supply system according to claim 1 wherein the stroke sensor monitors left and right front wheels of the vehicle.

* * * * *